United States Patent
Montuoro et al.

(10) Patent No.: US 7,266,962 B2
(45) Date of Patent: Sep. 11, 2007

(54) BATTERY SUPPLEMENTED REFRIGERATOR AND METHOD FOR USING SAME

(75) Inventors: Lou Montuoro, Cedar Rapids, IA (US); Ron Anderson, Cedar Rapids, IA (US); Frank Caci, Cedar Rapids, IA (US); Nelson J. Ferragut, II, Williamsburg, IA (US); Vincent Lyons, Cedar Rapids, IA (US); Andrew Strohm, Cedar Rapids, IA (US); Greg Carr, North Liberty, IA (US); Xiaoyong Fu, Plano, TX (US); Scott Voll, Cedar Rapids, IA (US)

(73) Assignee: Whirlpool Corporation, Benton Harbor, MI (US)

( * ) Notice: Subject to any disclaimer, the term of this patent is extended or adjusted under 35 U.S.C. 154(b) by 100 days.

(21) Appl. No.: 11/132,117

(22) Filed: May 17, 2005

(65) Prior Publication Data
US 2006/0260335 A1    Nov. 23, 2006

(51) Int. Cl.
*F25B 27/00* (2006.01)
(52) U.S. Cl. ............................ 62/236; 307/64; 307/151
(58) Field of Classification Search ................. 62/236, 62/440–441; 307/64, 151
See application file for complete search history.

(56) References Cited

U.S. PATENT DOCUMENTS

| | | | |
|---|---|---|---|
| 2,637,175 A | | 5/1953 | Alexander |
| 2,926,504 A | * | 3/1960 | Hellinger .................... 62/236 |
| 3,974,660 A | | 8/1976 | Farr |
| 4,216,385 A | * | 8/1980 | Omura et al. ................. 307/64 |
| 5,501,083 A | * | 3/1996 | Kim .......................... 62/228.4 |
| 5,816,491 A | | 10/1998 | Berkeley et al. |
| 5,878,584 A | | 3/1999 | Sasaki et al. |
| 5,929,538 A | | 7/1999 | O'Sullivan et al. |
| 6,067,482 A | | 5/2000 | Shapiro |
| 6,185,483 B1 | | 2/2001 | Drees |
| 6,345,512 B1 | | 2/2002 | Cosley et al. |
| 7,043,931 B2 | * | 5/2006 | Plummer ..................... 62/236 |

* cited by examiner

*Primary Examiner*—William E. Tapolcai
(74) *Attorney, Agent, or Firm*—Michael D. Lafrenz; Kirk Goodwin

(57) ABSTRACT

A refrigerator contains a battery pack for providing a DC current to drive a refrigeration system and alternatively is connectable to an AC power source for driving the refrigeration system from the AC power source. The DC battery pack is utilized during peak loads on the AC source of power, and the AC source of power is utilized during reduced loads on the AC power source. The electrical circuitry and components of the AC and DC power circuits are contained within a mechanical compartment located within the refrigerator.

28 Claims, 16 Drawing Sheets

BATTERY SUPPLEMENTED REFRIGERATOR AND METHOD FOR USING SAME

BACKGROUND OF THE INVENTION

The present invention relates to a battery supplemented refrigerator and method for using same.

In prior art refrigerators, direct current has been used for driving a refrigeration system from batteries through an inverter that converts the DC current from the batteries to AC current for the refrigeration system. Prior art devices have also used electrical circuitry for switching the battery activated refrigeration system to the household alternating current electrical system and for driving the refrigeration system by alternating current.

Therefore, a primary object of the present invention is the provision of an improved battery supplemented refrigerator and method for using same.

A further object of the present invention is the provision of a battery supplemented refrigerator and method for using same that uses direct current from a battery pack for cooling the refrigerator during periods of peak usage of the household supply AC system and utilizes AC current from the household supply system during periods of reduced load on the household AC system.

A further object of the present invention is the provision of a battery supplemented refrigerator that contains both an AC system and a DC system in a mechanical chamber located between the front and rear refrigerator walls so that the total depth of the refrigerator and the mechanical chamber are no greater than the standard depth of a refrigerator, the standard depth being in the approximate range of from 28 to 33 inches, with the doors attached.

A further object of the present invention is the provision of a battery supplemented refrigerator and method for using same which charges the battery pack during the time that the system is operated on AC from the household supply system.

A further object of the present invention is the provision of a battery supplemented refrigerator and method for using same which can be used in refrigerators within vehicles when an AC electrical source is not available.

A further object of the present invention is the provision of a battery supplemented refrigerator and method for using same which uses an automatic controller for controlling the operation of the system in either a DC mode or in an AC mode.

A further object of the present invention is the provision of a battery supplemented refrigerator and method for using same which includes a manual override switch.

A further object of the present invention is the provision of a battery supplemented refrigerator and method for using same which automatically switches to a DC mode when the controller senses a failure in the household AC current supply.

A further object of the present invention is the provision of a battery supplemented refrigerator and method for using same which utilizes the cooled air flow to provide cooling to an inverter/charger in the system.

A further object of the present invention is the provision of a battery supplemented refrigerator and method for using same that is efficient in operation, economical in manufacture, and durable in use.

SUMMARY OF THE INVENTION

The foregoing objects may be achieved by a refrigerator adapted to be connected to an AC power source. The refrigerator comprises a refrigerator cabinet having a rear wall, a front wall, opposite side walls, a top wall and a bottom wall. The refrigerator cabinet encloses one or more refrigeration compartments and a mechanical compartment between the front wall and the rear wall of the refrigerator cabinet. The mechanical compartment contains a battery pack, an inverter/charger, and a refrigeration system. One or more cooling systems are provided for cooling the one or more refrigeration compartments. The refrigeration system is connected to the one or more cooling systems for causing the cooling systems to cool the one or more refrigeration compartments. The inverter/charger includes an inverter mode wherein the inverter/charger is connected to the refrigeration system for converting DC electrical current to AC electrical current, and a charger mode wherein the inverter charger is connected to the battery pack for receiving AC electrical current and charging the battery pack. A switch is movable from a DC position connecting the battery pack to the inverter/charger and the refrigeration system for operating the refrigeration system to an AC position connecting the AC power source to the charger for charging the battery pack and to the refrigeration system for operating the refrigeration system According to another feature of the present invention, the controller is connected to the switch for causing the switch to move to the DC position during a first predetermined time and for causing the switch to move to the AC position during a second predetermined time. The first and second predetermined times are coordinated so that the first predetermined time coincides with the peak demand time and the second predetermined time coincides with the reduced demand time.

According to another feature of the present invention, the controller is capable of sensing a failure in an AC power source and is capable of automatically causing the switch to switch to the DC position upon sensing a failure in the AC power source.

According to another feature of the present invention, a manual override switch is positioned between the controller and the refrigeration system. The manual override switch has a first position connecting the battery pack and the inverter/charger to the refrigeration system and a second position connecting the AC power source to the refrigeration system and to the inverter/charger.

According to another feature of the present invention, the inverter/charger may be a single unit having an inverter mode for causing the inverter to drive the refrigeration system and having a charging mode for causing the charger to charge the battery pack. Alternatively, the inverter and charger may be separate units.

The method of the present invention comprises switching an electrical circuit from an AC mode wherein an AC power source drives the refrigeration system to a battery mode wherein a battery pack drives the AC refrigeration system. The electrical circuit may also be switched from the battery mode back to the AC mode. The AC power source includes a peak load time wherein a high power load is imposed upon the AC power source and a reduced load time wherein a lower power load is imposed upon the AC power source. The battery pack is charged during the time that the AC refrigeration system is in the AC mode. The switching of the electrical circuit between the battery mode and the AC mode is controlled so that the battery mode occurs during at least a portion of the peak load time.

According to another feature of the method of the present invention, the circuit while in the battery mode generates a DC current from the battery pack, converts the DC current to an AC current, and delivers the AC current to the refrigeration system.

According to another feature of the method of the present invention, the step of charging the battery pack is accomplished by using the AC power source to operate a charger connected to the battery pack.

According to another feature of the method of the present invention, the controlling step further comprises maintaining the electrical circuit in the battery mode only during at least a portion of the peak load time.

According to another feature of the method of the present invention, a failure of the AC power source is sensed and in response thereto the electrical circuit is switched to the battery mode automatically.

According to another feature of the method of the present invention, a single inverter/charger is used when switching the electrical circuit to the battery mode and when charging the battery pack during the AC mode.

According to another feature of the method of the present invention, the refrigeration system and the battery pack are maintained within a mechanical compartment located between a front wall and a rear wall of the refrigerator. The mechanical compartment is added to a cabinet depth refrigerator unit making the whole unit standard size (28 to 33 inches) in the front to back dimension.

According to another feature of the present invention the controller is programmed to cause the switch to move to the DC position during peak load conditions on the AC power source. The controller can be made responsive to a predetermined power change emanating from the AC power source, and preferably this predetermined power change is a reduction in the voltage from the AC power source. The controller can be adjusted to respond to a complete loss of voltage from the AC power source.

According to another feature of the present invention the controller includes a user input for causing the switch to move to the second position in response to a predetermined power condition in the AC power source.

According to another feature of the present invention the controller is connected to a plurality of electrical components and is convertible from at least a first control level activating all of the plurality of electrical components to a second control level activating a first group of the plurality of electrical components and deactivating a second group of the plurality of electrical components so as to reduce the power usage level.

According to another feature of the present invention the controller is programmed to select the first group of the plurality of electrical components so that the cumulative power consumption level of the plurality of electrical components is equal to or less than a predetermined power consumption level.

According to another feature of the present invention the controller is programmed to select the first group of the plurality of electrical components from the group consisting essentially of a light, an ice maker, a defrost heater, a high performance specialty compartment, a dispenser, a condenser fan, a damper motor, an anti-condensation heater, and a stirring fan.

According to another feature of the present invention the controller is connected to a temperature sensor for sensing the temperature of the at least one refrigerator compartment. The controller selects a first group comprising different combinations of the plurality of electrical components to keep the temperature within the at least one refrigerator compartment below a predetermined safe maximum temperature.

According to another feature of the present invention the controller is connected to a battery level sensor for sensing the level of battery power in the rechargeable battery and for converting from the first level to the second level in response to sensing a predetermined minimum level of battery power in the rechargeable battery.

According to another feature of the present invention the controller includes a timer for converting from the first level to the second level after a predetermined interval of time.

According to another feature of the present invention the second group of electrical components is selected from the group consisting essentially of the refrigeration system.

According to another feature of the present invention the controller includes a temperature sensor within the at least one refrigerator compartment. The controller converts from the first control level to the second control level in response to sensing temperature above a first predetermined temperature. The controller selects the first group of the plurality of electrical components in such a manner as to maintain a temperature within the at least one refrigerator compartment at a second predetermined safe temperature above the first predetermined temperature.

According to a further feature of the present invention there are at least a first and a second refrigerator compartment. A first electrical component and a second electrical component of the plurality of electrical components provide cooling of the first and second refrigerator compartments respectively. The controller deactivates the first electrical component when in the second control level.

As used herein, the term "refrigerator" refers to any type of refrigeration unit having cooling compartments cooled by at least one cooling system connected to a refrigeration system. The refrigeration system may be a DC driven or it may be AC driven. The preferred type of refrigeration system is AC powered.

The battery pack may include a plurality of rechargeable batteries, but preferably these batteries are of a size sufficient to fit within the bounds of the refrigerator.

The inverter of the present invention may be a separate unit or may be incorporated with a charger into one device. Incorporated into one device, the inverter operates to convert DC current to AC current. If a DC driven refrigeration system is used the inverter unit converts the AC line current to supply DC current. The charger operates when the device is in the AC mode and uses the AC current to charge the battery packs.

A controller is used for controlling the switching between the AC mode and the DC mode. This controller may be a microprocessor programmed to achieve the desired switching function. The controller may include a timer as well as other programming for sensing the failure of a power source.

The refrigeration system of the present invention may be either AC operated or DC operated without detracting from the invention.

DETAILED DESCRIPTION OF THE PREFERRED EMBODIMENT

Figure 1:
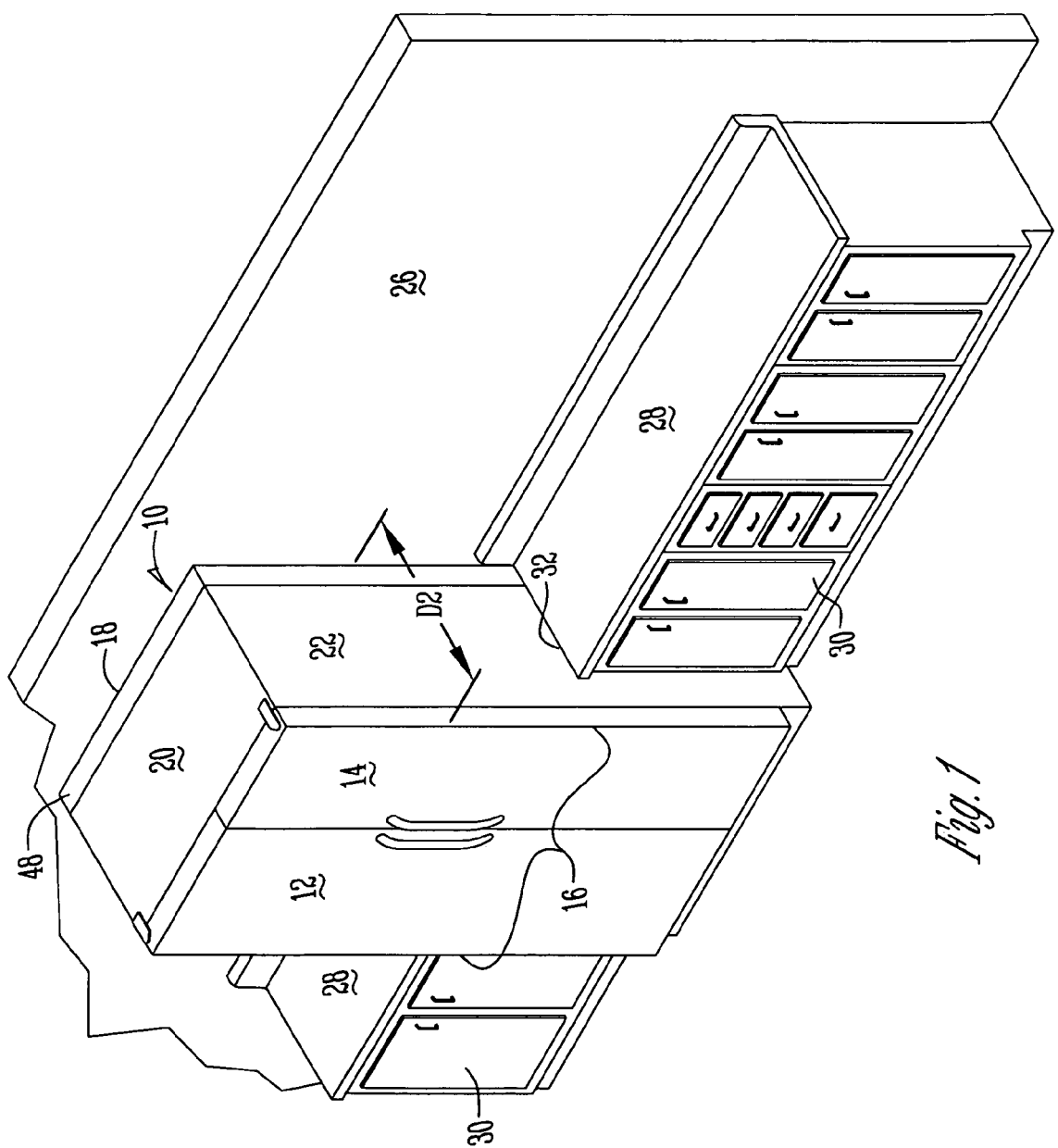
FIG. 1 is a perspective view of the refrigeration unit of the present invention.
Figure 2:
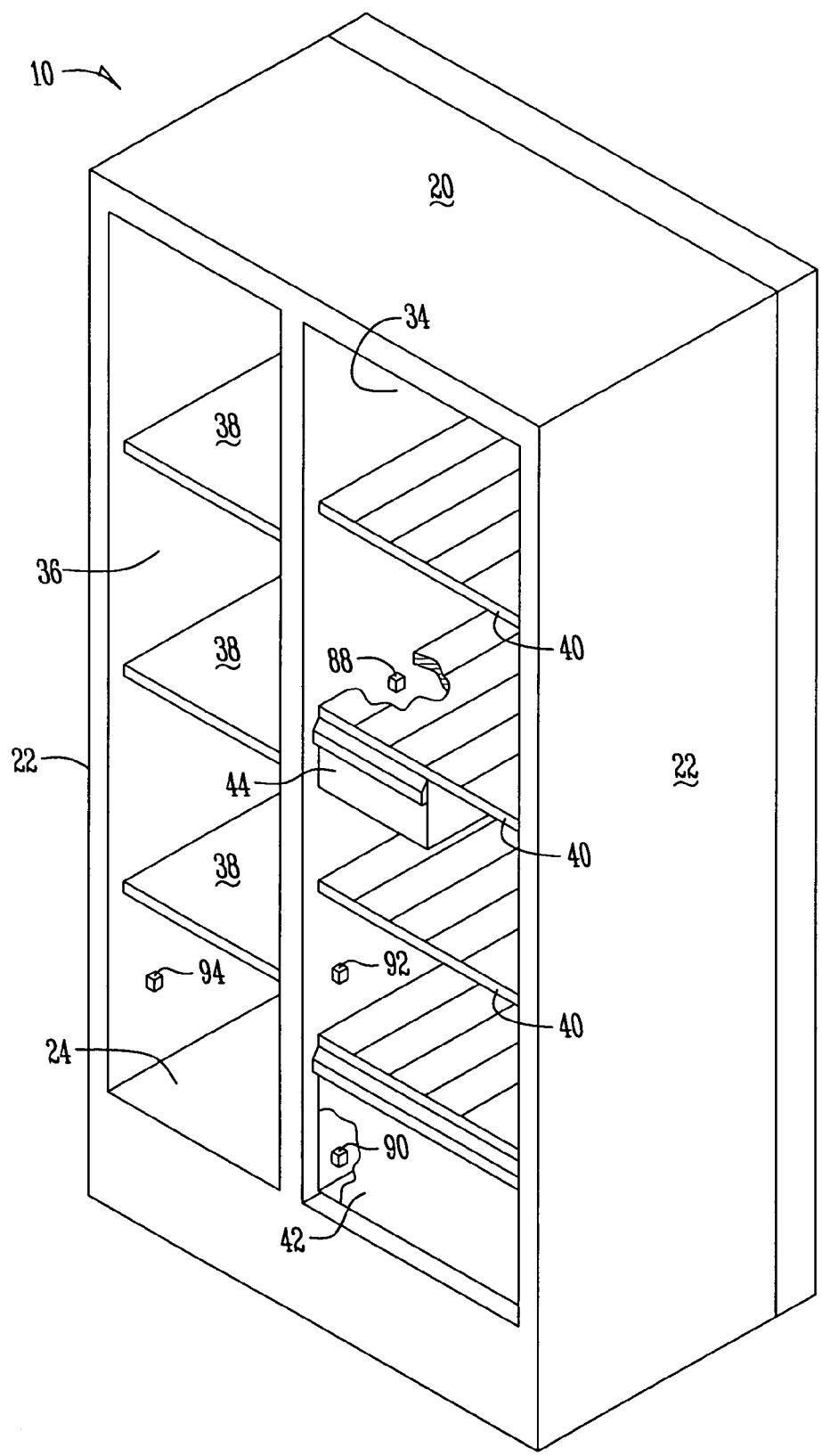
FIG. 2 is a front pictorial view of the refrigerator of FIG. 1 with the doors removed.
Figure 3:
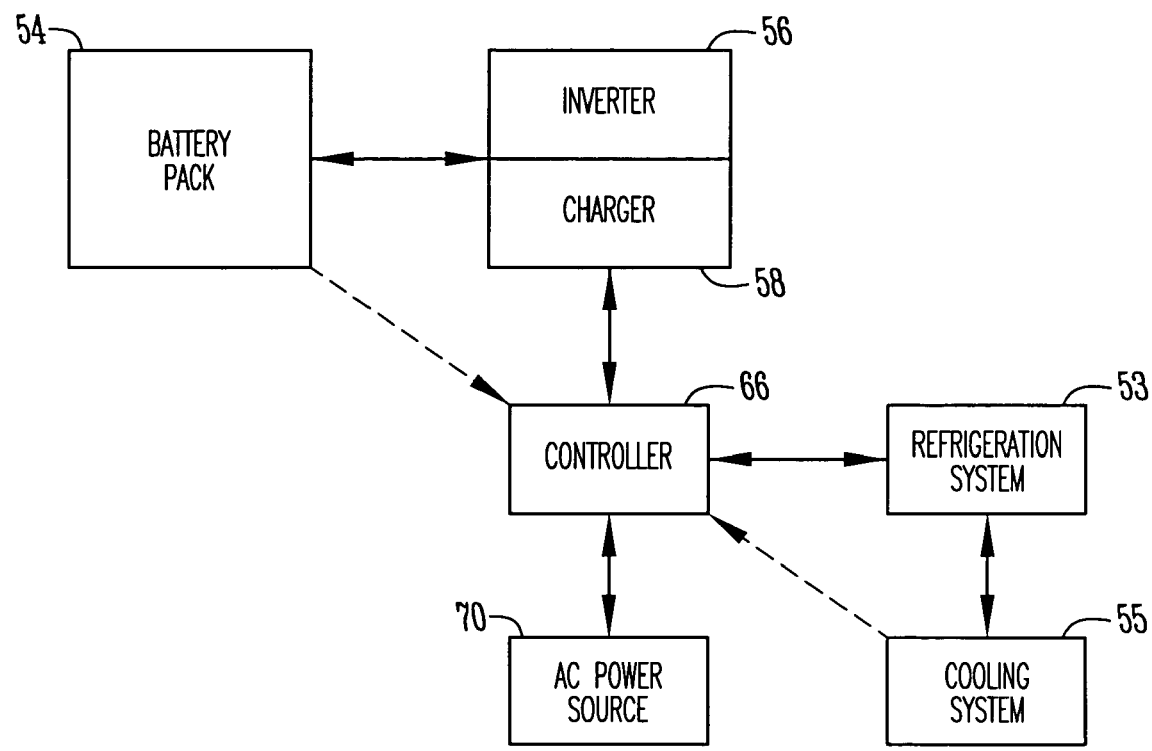
FIG. 3 is a schematic block diagram of the minimum base required circuitry for operating a battery supplemented refrigerator.

Referring to the drawings, the numeral 10 generally designates a refrigerator of the present invention. Refrigerator 10 includes a first door 12 and a second door 14 which together form a front wall 16. The number of doors forming the front wall 16 may vary without detracting from the invention. Refrigerator 10 also includes a back wall 18, a top wall 20, side walls 22, and a bottom wall 24 (FIGS. 2 and 3). In FIG. 1 a household wall 26 is shown and includes a countertop 28 abutting there against and having a series of under counter cabinets 30 mounted there under. A refrigerator opening 32 contains the refrigerator 10. The refrigerator includes a depth D2 between the front wall 16 and the rear wall 18. As known in the art counter depth refrigerators have a depth D1 (FIG. 3) of approximately twenty-seven (27) inches, including the doors. This is approximately four (4) inches less than a "standard" refrigerator. As used herein the term "standard" depth refers to a total depth of the refrigerator in the range of twenty-eight (28) to thirty-three (33) inches. To decrease tooling costs, it may be possible to utilize a counter depth refrigerator platform and have a "dead space" at the rear of the refrigerator, equivalent to the difference between the standard D2 and the counter depth D1 refrigerator. Within this dead space of a refrigerator 10 can be included a mechanical compartment 48 containing electrical circuitry and various components which occupy space. It is preferred that the total depth of refrigerator 10, including the front doors 12, 14 and the mechanical compartment 48 be in the range of a standard depth refrigerator (between 28 to 33 inches).

Referring to FIG. 2, the doors 12, 14 are removed exposing a first cooling compartment 34 and a second cooling compartment 36. The number of cooling compartments may be more or less than two as desired and do not affect the present invention. Each cooling compartment 34, 36 includes various shelves 38, wire shelves 40, a crisper 42, and a meat compartment 44. A meat compartment temperature sensor 88 is within meat compartment 44; a crisper temperature sensor 90 is within the crisper 42; and first and second compartment temperature sensors 92, 94 are within compartments 34, 36 respectively. These features are conventional in refrigeration units and may be added or detracted without affecting the present invention.

A refrigeration system 53 (FIG. 3) which is operatively connected to a cooling system 55 is controlled by a controller 66. Controller 66 preferably monitors the refrigeration system 53 or the cooling system 55 or both. Controller 66 controls and monitors an AC power source 70. The AC power source 70 provides power to controller 66. AC power source 70 also powers an inverter/charger 56/58. One skilled in the art will appreciate that the inverter/charger 56/58 may be a single component or separate components. It is not necessary, if separate units, for inverter 56 and charger 58 to be connected to one another, but is preferable for each to be operatively connected to controller 66. Charger 58 charges a battery pack 54. In turn, battery pack 54 provides power to the inverter 56. Controller 66 monitors battery pack 54.

The refrigeration system 53 may utilize a Rankine vapor-compression cycle and contain a compressor and a heat exchanger fan, a Stirling cycle and contain a Stirling motor and a circulation pump, an absorption system and contain a pump and an electric heater, a thermoelectric system and contain a thermoelectric element, a magnetic system and contain an electromagnet and a fan, or an acoustic system and contain a speaker and a fan. Alternatively, other refrigeration systems 53 may be utilized.

Figure 4:
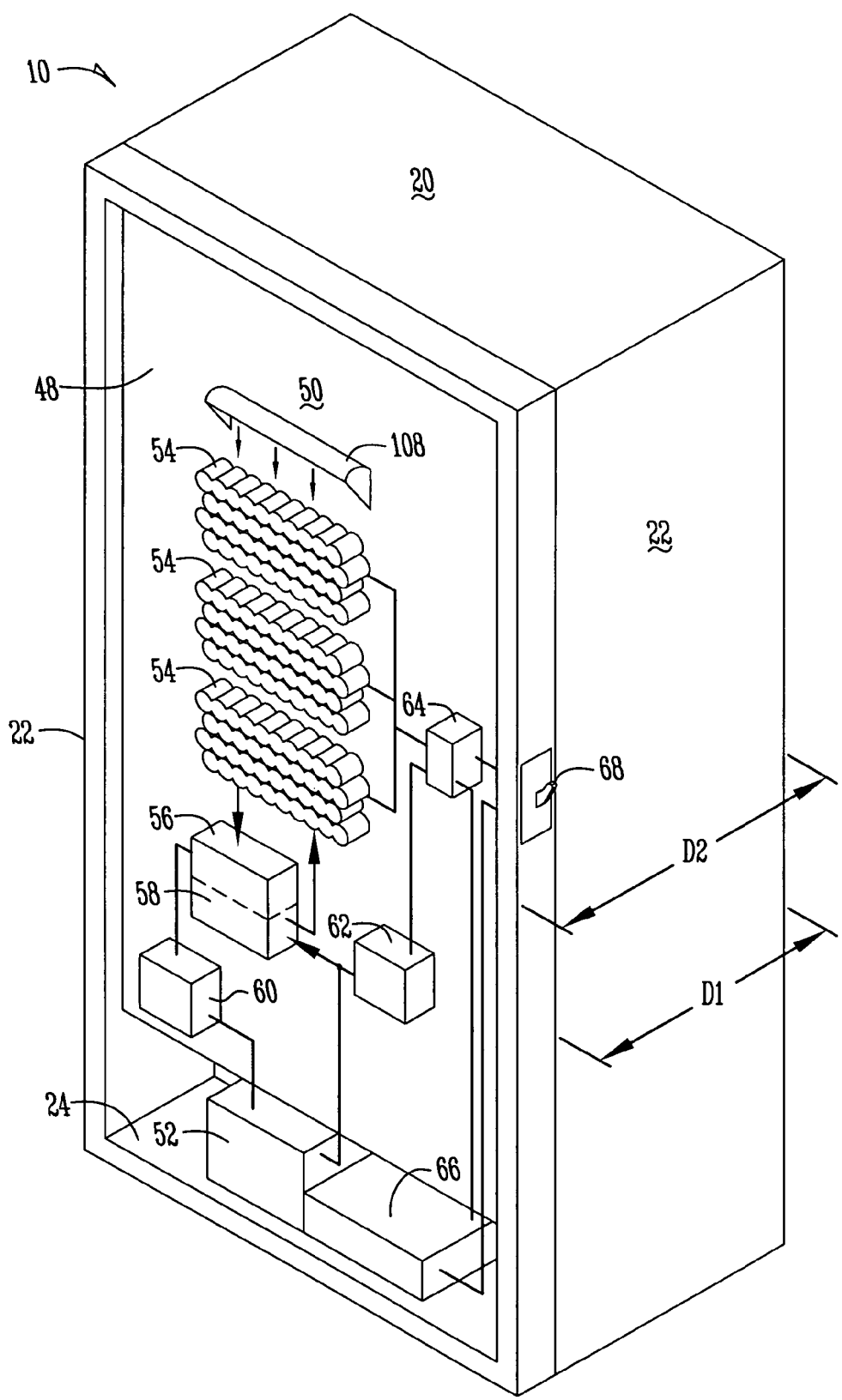
FIG. 4 is a rear pictorial view of the refrigerator of FIG. 1 with the rear wall being removed to expose the mechanical compartment.

Referring to FIG. 4, the rear wall 18 has been removed exposing a mechanical compartment 48 within the rear portion of the refrigerator 10. The mechanical compartment includes an interior wall 50 upon which the various components of the present invention are mounted. These components include a compressor 52, a battery pack 54, an inverter 56, a charger 58, an inverted electrical circuit represented schematically by the box 60, an AC circuit represented schematically by the box 62, a controlled switch 64, and a controller 66. A manual override switch 68 may be mounted on the outside of the refrigerator or may be included elsewhere without detracting from the invention.

A cooling system 46 (FIG. 5) having an evaporator, an expansion device and a condenser for Rankine cycle refrigeration, is used to cool the compartments 34, 36. There may be more than one cooling system 55 or there may be only one depending upon the particular desired configuration for the refrigerator 10. As illustrated, a cooling coil 46 may be part of the cooling system 55.

Figure 5:
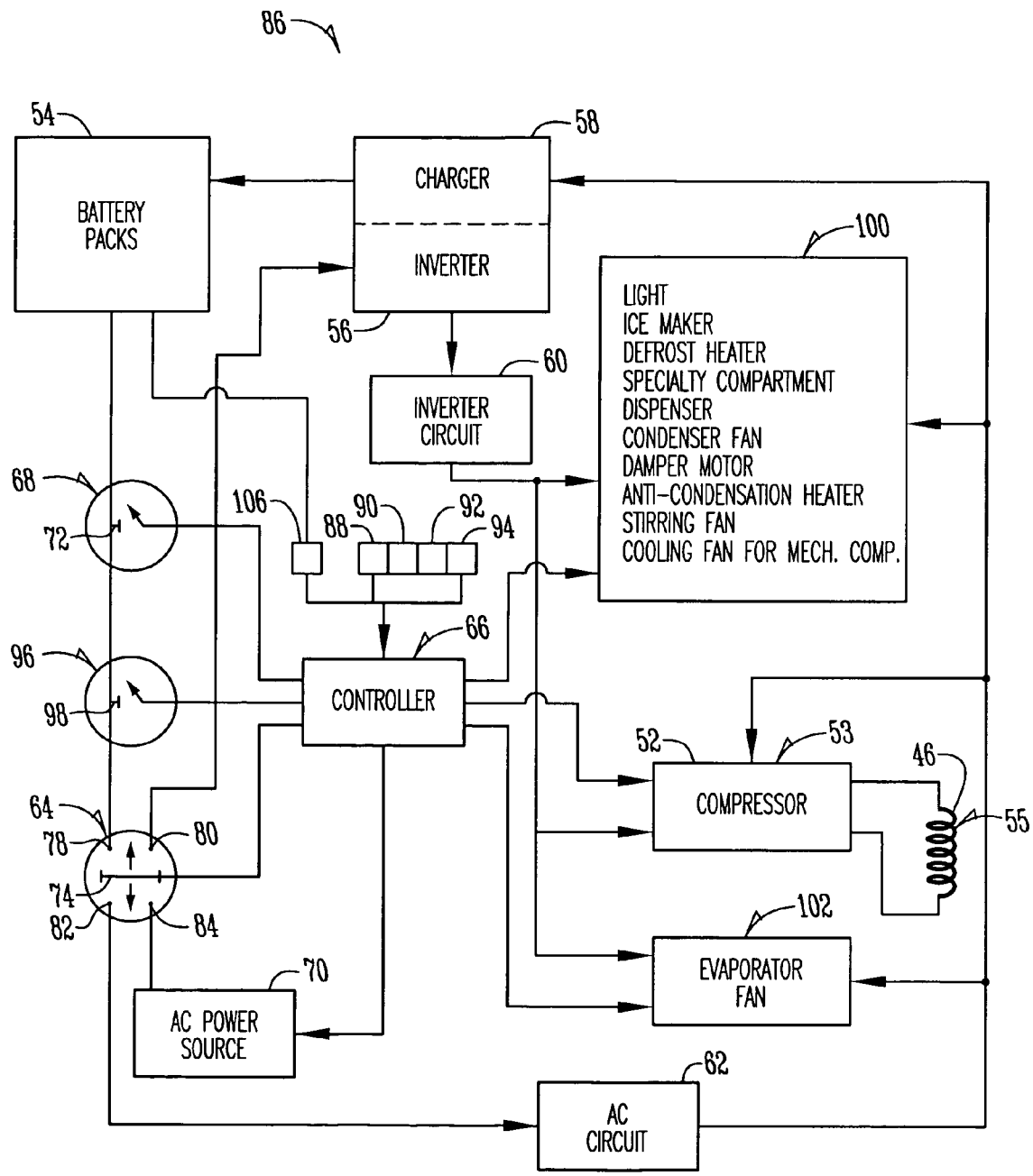
FIG. 5 is a schematic block diagram showing the circuitry for operating an AC refrigeration system.

FIG. 5 is a schematic illustration of the various components as used with an AC driven refrigeration system 53 having a compressor 52 and evaporator fan 102 for Rankine cycle refrigeration. The overall circuitry shown in FIG. 5 is represented by the numeral 86 which represents the electrical circuit. An AC power source 70 is provided for providing electrical AC current to the circuit 86. Conventional household AC power sources such as source 70 operate at peak load times and at reduced load times. During the peak load times, a larger number of users draw upon the alternating current from the AC source 70 and/or draw more power per user. During a reduced load time such as night time, the number of users drawing upon the AC power source 70 are fewer and/or there is less power drawn per user. As a result the rates are often lower during periods of reduced use so as to encourage users to utilize electrical current during those periods of reduced load time.

The AC power source is connected to the controller 66. The controller 66 is connected to the controlled switch 64 which includes spaced apart pairs of automatic DC contacts 78, 80 and a spaced apart pair of automatic switch AC contacts 82, 84. A movable contact 74 is movable to a DC position wherein it closes contacts 78, 80 and places the electrical circuitry 86 in a DC mode, or alternatively is movable to close the contacts 82, 84 and place the circuitry 86 in an AC mode.

A manual override switch 68 is provided for closing with manual switch DC contact 72 for manually placing the circuit 86 in a DC mode. The controller 86 is connected to the manual override switch 68 for sensing when the override switch 68 is in its closed position. The controller 86, in response to sensing this position of the manual override switch 68 causes the movable switch element 74 to be placed in its neutral position shown in FIG. 5.

When either the manual override switch 68 or the controlled switch 64 are in their DC mode positions, the battery packs deliver DC current to the inverter 56. The inverter 56 converts the DC current to AC current and delivers the AC current through an inverted circuit 60 to the refrigeration system 53. The refrigeration system 53 then is operated to cool the cooling system 55.

When the manual override switch 68 is in its open position as shown in FIG. 5 and the control switch 64 is in its AC position closing contacts 82, 84, the circuit 86 is in the AC mode. In this mode, AC current is delivered from the AC power source 70 to the AC circuit 62 and then to the refrigeration system 53 for driving the refrigeration system 53 and cooling the cooling system 55. At the same time, the AC current is connected to the charger 58, and charges the battery packs 54.

An automatic switch 96 is connected to and controlled by controller 66. Controller 66 can automatically close switch 96 to place both the AC circuit 62 and the inverter circuit 60 in driving electrical connection with refrigeration system 53 so that the battery packs supplement the AC power source in driving refrigeration system 53.

Figure 6:
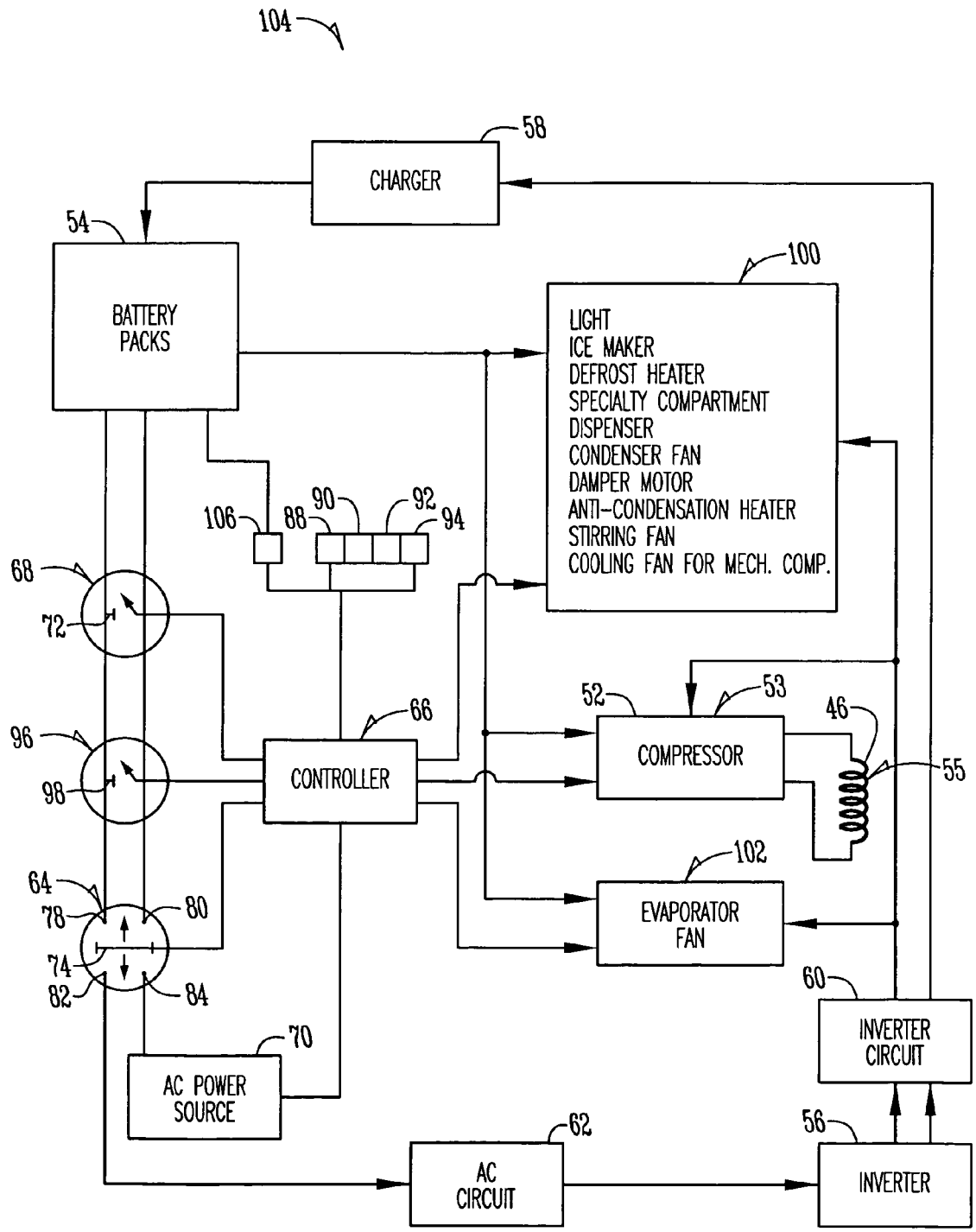
FIG. 6 is a schematic block diagram showing the circuitry for operating a DC refrigeration system.

In FIGS. 5 and 6 the switches 64, 96 are shown as separate switches outside controller 66, but in preferred form the switches 64, 96 are within controller 66 and can be logic switches rather than mechanical switches.

The numeral 100 designates a plurality of electrical components that are adapted to be actuated by either the battery pack 54 or the AC power source 70 or both. These components are considered to be of lesser significance in the event of a failure of either the AC power source or the battery packs. They include an electric light, an ice maker, a defrost heater for defrosting the cooling system 55, controls for the specialty compartments such as the crisper 90 and the meat compartment 88, a dispenser for dispensing ice or ice water, a condenser fan for blowing air over a condenser, a damper motor for opening or closing various dampers in the refrigerator, an anti-condensation heater for heating and removing condensation around the margins of the doors of the refrigerator, a stirring fan for circulating air within the refrigerator, and a mechanical cooling fan for directing air over the components within the mechanical compartment 48 through a vent 108.

The refrigeration system 53 is more critical to the operation of the refrigerator than the components shown in box 100. The controller 66 is connected to the plurality of electrical components 100 and the refrigeration system 53. The controller by being connected to these components is capable of shutting various combinations of these electrical components down. In normal operation, all of the electrical components are operated both by the battery pack and/or the AC power source. However, in emergency situations where either or both the battery pack and the AC power source have limited electrical power, the controller shuts down all or a portion of the non-essential components shown in box 100. It is possible also for the controller to shut down the refrigeration system 53 periodically if necessary to conserve energy. The controller can be programmed to provide all of these functions.

Furthermore, the controller is connected to a battery power sensor 106 which in turn is adapted to sense the power reserve within battery packs 54. If the sensor 106 senses a reduction in the power of battery packs 54 below a predetermined value, the controller responds to this sensing and shuts down some or all of the components in box 100, and in some situations shuts down component 53.

The controller is also connected to the sensors 88, 90, 92, and 94 for sensing the temperature within each of the various compartments 44, 42, 34, and 36 respectively. The controller can be set to shut down any of these compartments by closing the damper motors to them whenever the temperature within those compartments is below a predetermined temperature. Thus the controller can control the actuating and de-actuating of the damper motors in such a manner as to permit the temperature of the various compartments to be maintained below a certain predetermined temperature.

The controller 66 is adapted to operate at two levels. In the first level, all of the components 100, 52 and 102 are actuated. At the second level, a first group of components selected from group 100 is actuated and a second group of components from group 100 is de-actuated. It is also possible to de-actuate all of the components in box 100, leaving only the refrigeration system 53 actuated. Alternatively it is possible to shut down all of the components in the event of a power failure, and to reactivate the refrigeration system 53 whenever the temperature sensed by sensors 88, 90, 92, 94 increases above a predetermined temperature.

Referring to FIG. 6, an alternative embodiment of the present invention is shown for operating a refrigeration system 53 that is driven by DC current. The components are the same, but they are connected together in a different manner. The primary difference between the schematic shown in FIG. 5 and the schematic shown in FIG. 6 is that refrigeration system 53 in FIG. 6 is driven by DC current rather than by AC current as is the case in FIG. 5. Thus, when the switch 74 is in its AC position contacting contacts 82, 84, the AC circuit, inverter, and inverter circuit all drive the components 53 and 100. At the same time the inverter 56 and the inverter circuit 60 operate the charger 58 to recharge the battery pack 54.

When the switch 74 is in its upper most position contacting closing contacts 78, 80, the circuitry is in its DC mode and the battery pack 54 drives the electrical components 53 and 100. The automatic control switch 96 functions in the same manner as in FIG. 5 to activate both the battery pack 54 and the AC circuit 62 to cause simultaneous driving of the components 53 and 100.

The specific circuits shown in FIGS. 5 and 6 are illustrative only, and various types of circuits may be used for alternatively connecting the AC power source and the battery packs to the refrigeration system 53.

The method of the present invention comprises using the controller 66 to switch the automatic switch 64 to its AC position and alternatively to its DC position. Alternatively, the manual override switch 68 may be used to place the battery pack in a DC mode. A third alternative can be obtained by the controller 66 closing switch 96 and moving switch 64 to close contacts 82, 84. This third alternative places both the AC power source and the battery pack 54 in operation simultaneously to supplement one another. When the circuitry is in its AC mode, the battery pack is also charged by means of charger 58. Switching of the electrical circuit between the battery mode and the AC mode is done so that the battery mode occurs during at least a portion of the peak load time of the AC power source, thereby reducing the load on the AC power source and also resulting in saving of cost. This may also be used to ensure a maximum amperage drawn from the AC powersource is not exceeded. Alternatively the AC powersource can be used as a supplement when the battery is unable to provide sufficient amperage (e.g. the amperage required by the refrigeration system exceeds the amperage available to the refrigeration system via the battery).

The mechanical compartment 48 is sufficiently thin in depth so that the distance between the front wall and the rear wall is kept equal to or less than the standard depth of a refrigerator (28 to 33 inches).

Another feature of the method of the present invention includes the sensing of when the AC power source is inoperative, and automatically switching the automatic switch 64 to the DC position. This saves the refrigerator contents during times when the AC power source is inoperable such as during electrical storms or other outages of the AC power source. Thus the battery pack is used to cool the contents of the refrigerator during times when the AC power source is inoperative or broken down.

The present invention contemplates that battery power may be saved in numerous ways before the battery pack 54 is recharged or replaced. In one embodiment, the methodology provides for using only battery power during periods of operation. Battery power is saved by shutting-off non-critical areas in the refrigerator and only cooling or operating critical areas. Critical areas could include medical supplies areas and critical item areas.

Figure 7:
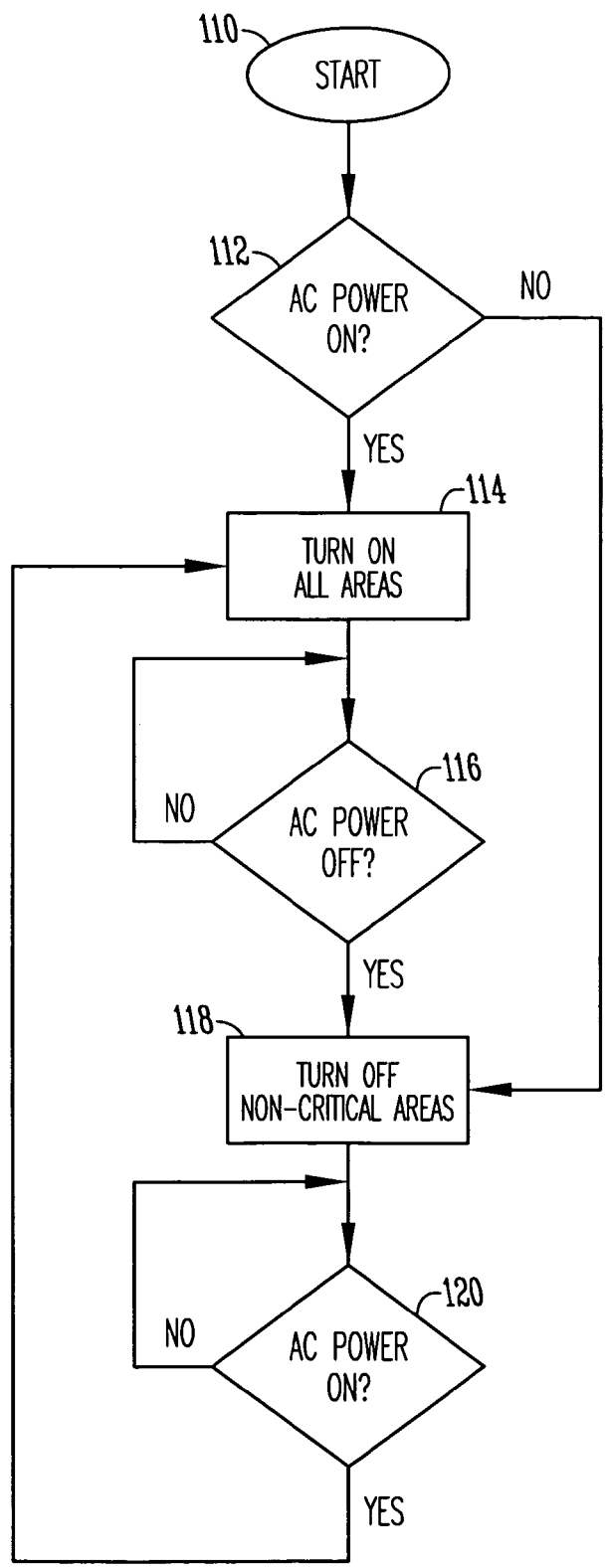
FIG. 7 is a schematic block diagram showing how power may be saved while running under battery power by shutting off non-critical areas in the refrigerator.

FIG. 7 shows the method. The method starts at 110. A determination of whether AC power is on is made in 112. If AC power is not on, proceed to 118. If AC power is on, proceed to 114 where all areas are turned on. Proceed to 116 where a determination is made whether AC power is off. If AC power is not off, proceed again to 116. If AC power is off, proceed to 118 where non-critical areas are turned off. Finally, proceed to 120 where another determination is made of whether AC power is on. If AC power is not on, proceed again to 120. If AC power is on, proceed to 114.

According to another embodiment, the methodology of the present invention provides using thermal mass and/or phase change materials to prolong low temperatures inside storage compartments thereby reducing the need for electrical power during outages.

According to another embodiment, the methodology of the present invention provides for an algorithm to deliver a series of pulses (on/off power) to the refrigerator to achieve acceptable operation and prolong battery pack 54 life.

Figure 8:
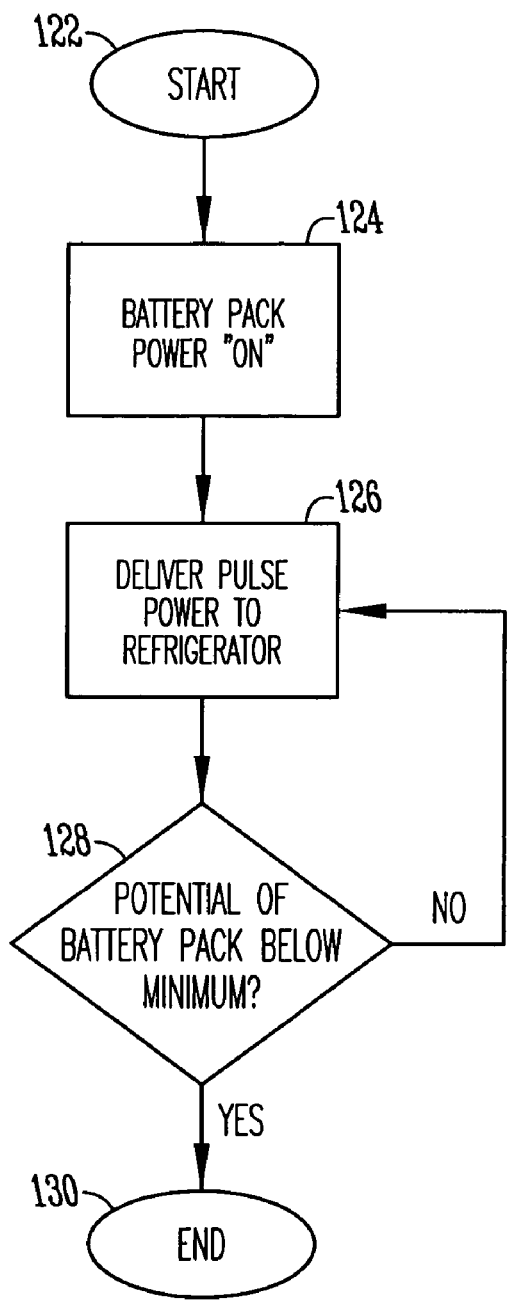
FIG. 8 is a schematic block diagram showing a battery delivering pulse power to a refrigerator until the potential of the battery is too low.

FIG. 8 shows the method starting at 122. Proceed to 124 where the battery pack 54 is on and then to 126 where the battery pack delivers pulse power to the refrigerator. Proceed to 128 which is a determination of whether the potential of the battery pack is below the minimum cut-off. If the potential is below the cut-off, proceed to the end 130. If the potential of the battery pack is above the minimum cut-off, proceed to 126.

According to another embodiment, the methodology of the present invention provides for using the relatively colder areas of the refrigerator to provide cooling to critical areas. This can be accomplished by conduction or controlling fans and valves to remove heat from these critical areas. Critical areas include whole fresh food areas or other compartments deemed critical.

Figure 9:
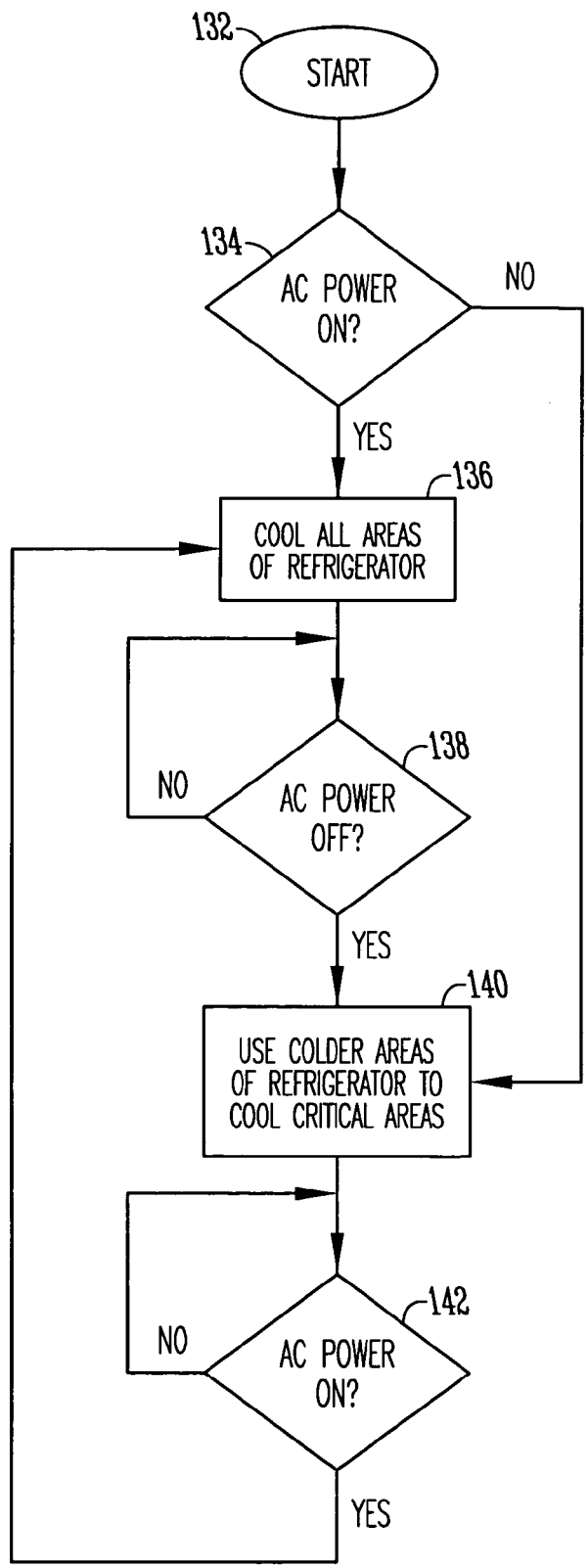
FIG. 9 is a schematic block diagram showing that when AC power is unavailable, colder areas of the refrigerator are used to cool critical areas.

FIG. 9 shows the method starting at 132 and proceeding to 134 where a determination is made whether the AC power is on. If the AC power is not on, proceed to 140. If the AC power is on, proceed to 136 where all areas of the refrigerator are cooled. Proceed to 138 where a determination is made whether the AC power is off. If the AC power is not off, proceed again to 138. If the AC power is off, proceed to 140 where cooler areas of the refrigerator are used to cool critical areas. Proceed to 142 where a determination is made whether the AC is on. If the AC power is not on, proceed again to 142. If the AC power is on, proceed to 136.

According to another embodiment, the methodology of the present invention provides for shutting down power to all non-essential (for food preservation) components including, for example, the defrost heater, lights, specialty compartments, dispenser auger motor, door solenoid, ice maker, condenser fan, air flow damper motors and controllers, anti-sweat heaters and air stirring fans.

Figure 10:
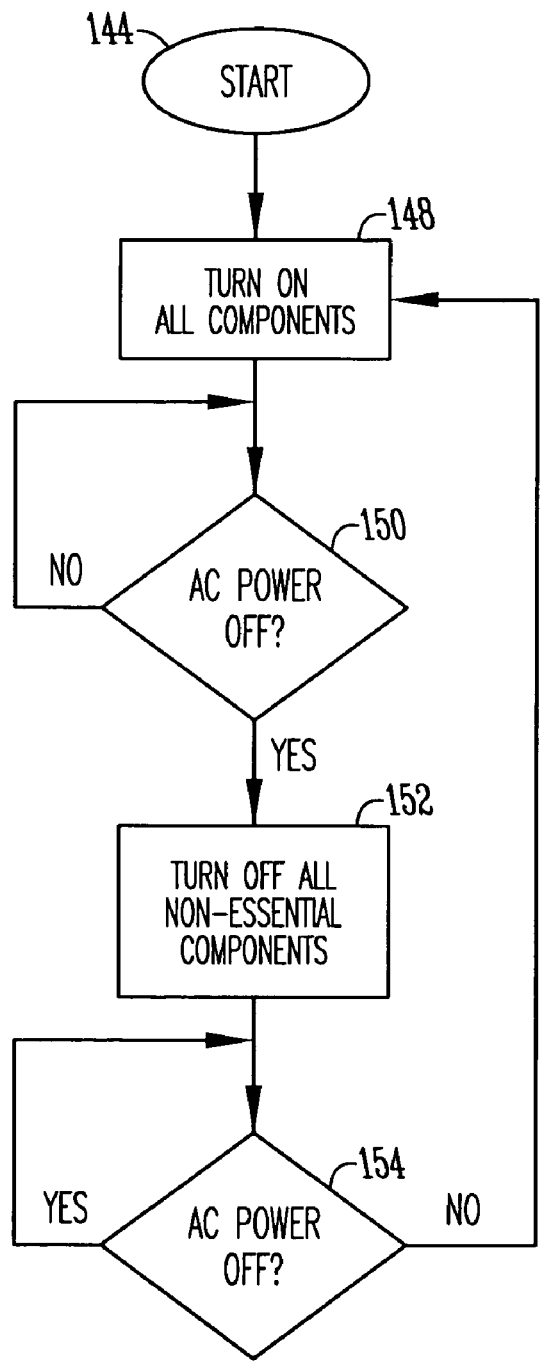
FIG. 10 is a schematic block diagram showing how power may be saved while running under battery power by shutting off non-essential components in the refrigerator.

FIG. 10 shows the method starting at 144 and proceeding to 148 where all components are turned on. Proceed to 150 where a determination is made whether the AC power is off. If the AC power is not off, proceed again to 150. If the AC power is off, proceed to 152 where all non-essential components in the refrigerator are turned-off. Proceed to 154 where a determination is made whether the AC power is off. If the AC power is off, proceed again to 154. If the AC power is not off, proceed to 148.

According to another embodiment, the methodology of the present invention provides for prioritizing which compartments or zones within the refrigerator receive power. For example, a specialty medical storage compartment temperature is monitored and maintained while control in other zones is sacrificed.

Figure 11:
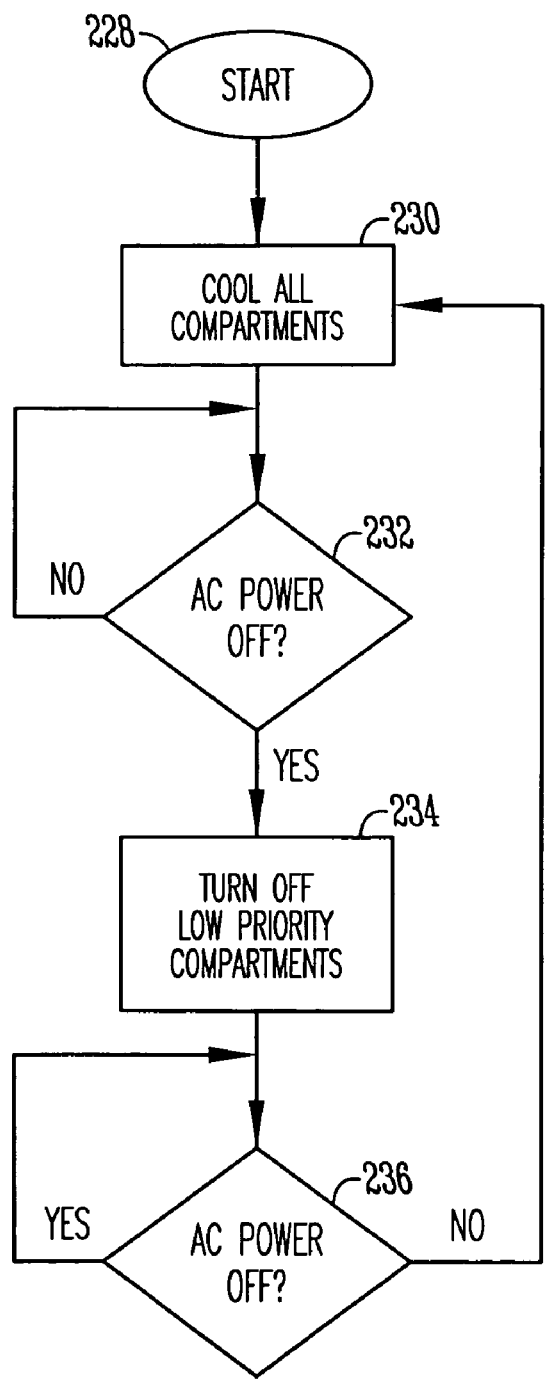
FIG. 11 is a schematic block diagram showing how power may be saved while running under battery power by shutting down low priority zones or compartments.

FIG. 11 shows the method starting at 228 and proceeding to 230 where all zones or compartments are cooled. Proceed to 232 where a determination is made whether the AC power is off. If the AC power is not off, proceed again to 232. If the AC power is off, proceed to 234 where all low priority zones or compartments are turned off. Proceed to 236 where a determination is made whether the AC power is off. If the AC power is off, proceed again to 236. If the AC power is not off, proceed to 230.

According to another embodiment, the methodology of the present invention provides for staging power to functioning components. For example, for the first minute of power outage, all components continue to operate normally off battery power. After one minute, the lights, specialty compartments, defrost, icemaker, mullion heater and stirring fan will shut off. After one hour, the damper motor and condenser fan will shut off. This shutdown strategy is dependent on the charge state of the battery pack 54 when the AC power source 70 is interrupted. If the battery pack 54 is minimally charged, the shut down strategy may be accelerated. Also, if the rate of energy draw from the battery pack 54 will affect the total battery power available, different components may still be energized, but in a staged method to maximize total power available.

Figure 12:
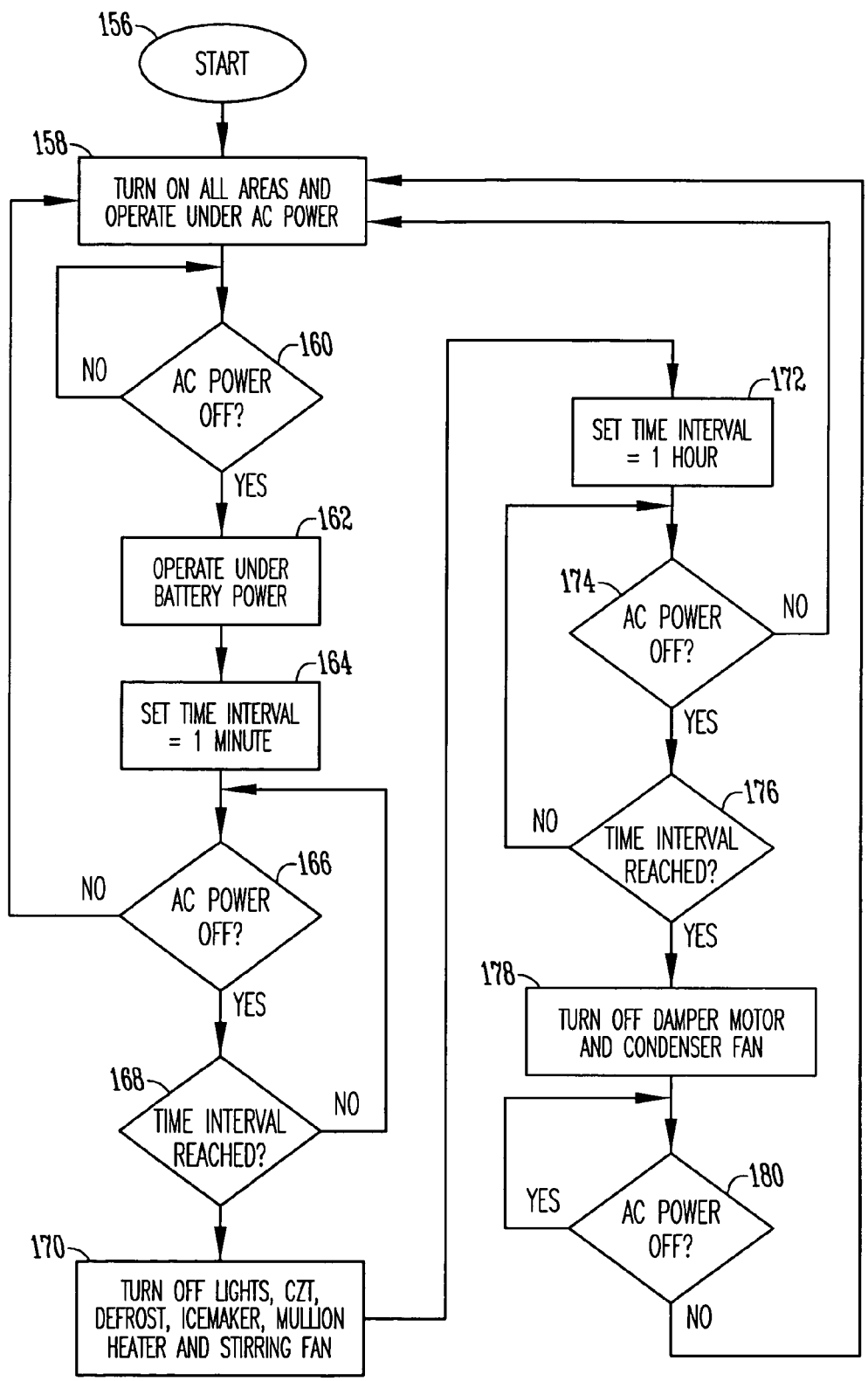
FIG. 12 is a schematic block diagram showing how if there is an AC power outage, battery power to refrigerator components is staged with the least important components shut down first.

FIG. 12 shows the method starting at 156 and proceeding to 158 where all areas are turned on and operating under AC power. Proceed to 160 where a determination is made whether the AC power is off. If the AC power is not off, proceed again to 160. If the AC power is off, proceed to 162 where the refrigerator operates under battery power and then to 164 where a time interval is set for 1 minute. Proceed to 166 where a determination is made whether the AC power is off. If the AC power is not off, proceed back to 158. If the AC power is off, proceed to 168 where a determination is made whether a time interval is reached. If the time interval is not reached, return to 166. If the time interval is reached, continue to 170 where the lights, specialty compartments, defrost, icemaker, mullion heater and stirring fan are turned off. Proceed to 172 where a time interval is set for 1 hour and then to 174 where a determination is made whether the AC power is off. If the AC power is not off, proceed back to 158. If the AC power is off, proceed to 176 where is determination is made whether a time interval is reached. If the time interval is not reached, return to 174. If the time interval is reached, continue to 178 where the damper motor and condenser fan are turned off. Proceed to 180 where a determination is made whether the AC power is off. If the AC power is off, proceed again to 180. If the AC power is not off, proceed to 158, turn-on all areas and operate under AC power.

According to another embodiment, the methodology of the present invention provides for incorporating logic to sense an extended power outage. This is accomplished by simply monitoring low/no voltage on the incoming line and monitoring the length of the power outage. At a specific time, the control logic changes the compartment temperature set points to the maximum recommended temperatures for fresh food storage (e.g. 40° F.) and freezer storage (e.g. 10° F.). This minimizes the heat load on the compartments. This method may be improved if a sensing or logic means is provided to estimate the charge remaining on the battery pack 54 and intervenes at an earlier point in time if the battery pack 54 is particularly low on charge.

Figure 13:
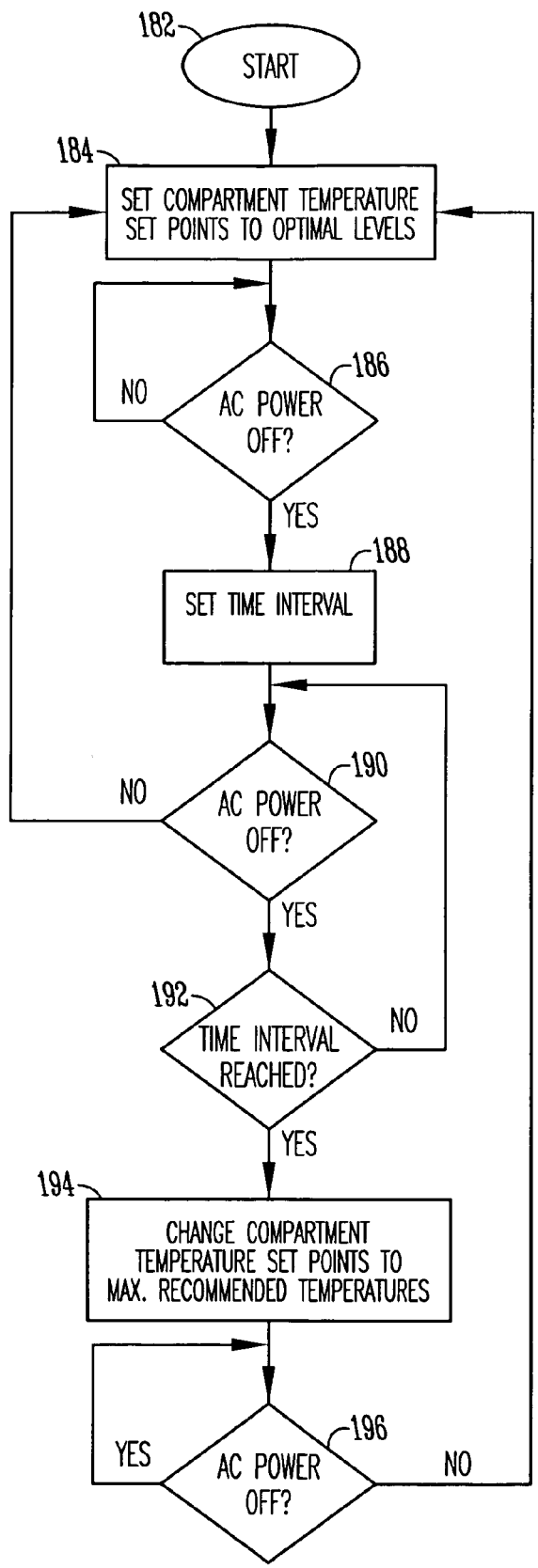
FIG. 13 is a schematic block diagram showing that when AC power is unavailable, back-up battery power can be conserved by increasing, after a set period of time, refrigerator compartment temperature set points.

FIG. 13 shows the method starting at 182 and continuing to 184 where compartment temperature set points are set to optimal levels. Proceed to 186 where a determination is made whether the AC power is off. If the AC power is not off, proceed again to 186. If the AC power is off, proceed to 188 where a time interval is set. Proceed to 190 where a determination is made whether the AC power is off. If the AC power is not off, proceed to 184. If the power is off, proceed to 192 where a determination is made whether a time interval is reached. If the time interval is not reached, proceed back to 190. If the time interval is reached, proceed to 194, change compartment temperature set points to the maximum recommended temperatures. Proceed to 196 where a determination is made whether the AC power is off. If the AC power is not off, proceed to 184. If the AC power is off, proceed again to 196.

According to another embodiment, the methodology of the present invention provides for increasing the temperature settings in the freezer and/or refrigerator to reduce the cooling requirements in one or both of these compartments. The reduced cooling requirement reduces the run time of the refrigeration system which in turn reduces the power draw to the battery pack 54 and consequently extends the time the battery pack 54 backup system can function as a power source for the refrigeration cooling system.

Figure 14:
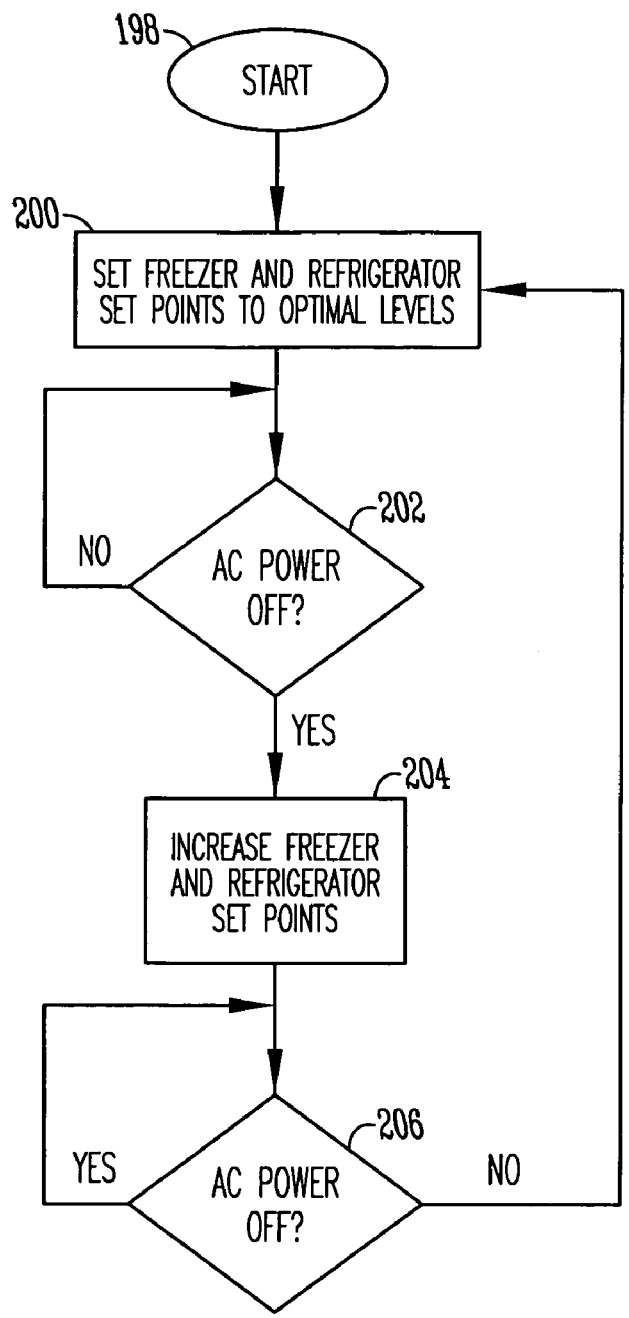
FIG. 14 is a schematic block diagram showing that when AC power is unavailable, back-up battery power can be conserved by increasing the set temperatures in refrigerator and freezer compartments.

FIG. 14 shows the method starting at 198 and proceeding to 200 where the refrigerator and freezer set points are set to optimal levels. Proceed to 202 where a determination is made whether the AC power is off. If the AC power is not off, proceed again to 202. If the AC power is off, proceed to 204 where refrigerator and freezer set points are increased. It should be understood that both the maximum and minimum set points could be increased to maintain the same variance of temperature, or alternatively, the variance, (e.g. the temperature difference between the minimum set point and the maximum set point) could be increased. For example one embodiment may provide for raising both the minimum and maximum set points uniformly. An alternative embodiment is raising only the maximum set point, thereby increasing the allowed temperature variance as well as the maximum set point. This may allow for reduced energy comsumption due to overhead power utilized during initial energizing of the refrigeration system as well as due to energy wasted during the de-energizing of the refrigeration system. A third embodiment is to increase the maximum set point more than minimum set point, thereby allowing an increase in the allowed temperature variance for similar reasons as discussed in the second embodiment. Proceed to 206 where a determination is made whether the AC power is off. If the AC power is off, proceed again to 206. If the AC power is not off, proceed to 200.

According to another embodiment, the methodology of the present invention provides for using variable speed motors to reduce the energy draw on the backup battery pack 54. During a power outage, the system shifts to the backup battery pack 54 and reduces the speeds of the motors in the refrigeration system accordingly to minimize power draw from the battery system. This provides the refrigeration compartments with a reduced but nominal amount of cooling and extends the time the unit can be cooled utilizing a battery pack 54 system in the event of a power failure.

Figure 15:
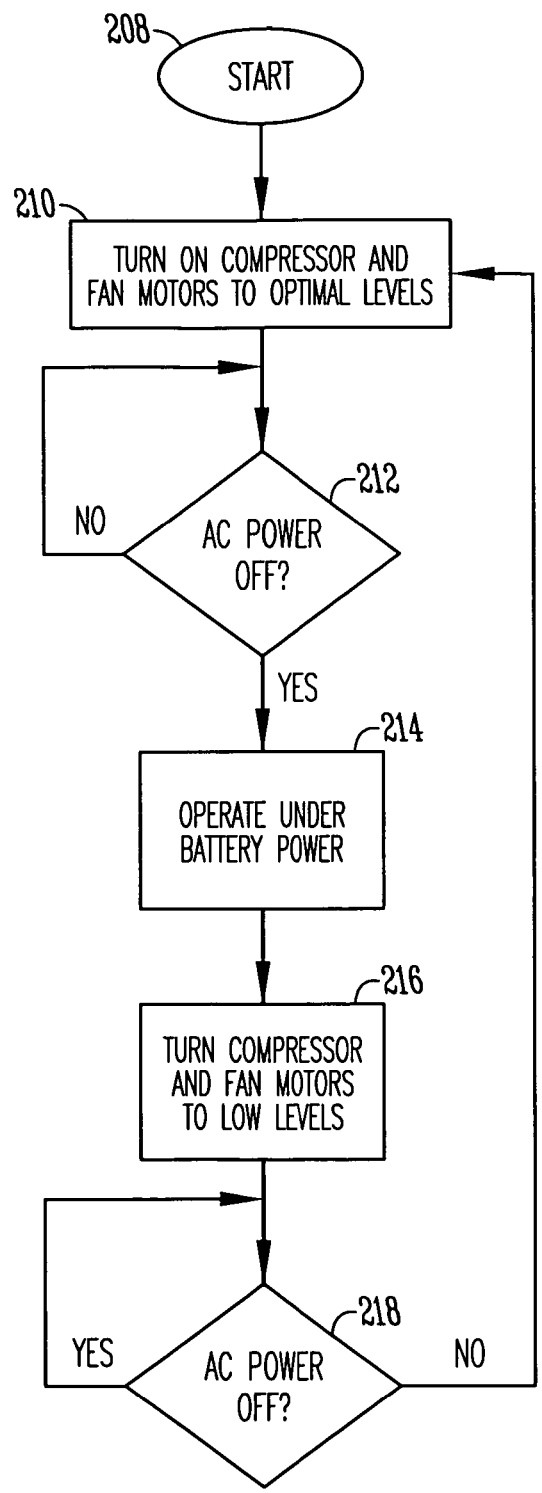
FIG. 15 is a schematic block diagram showing that when AC power is unavailable, back-up battery power can be conserved by decreasing the speeds of the motors to low levels.

FIG. 15 shows the method starting at 208 and continuing to 210 where the motors are set to optimal levels. Proceed to 212 where a determination is made whether the AC power is off. If the AC power is not off, proceed again to 212. If the AC power is off, proceed to 214, operate under battery power and to 216, turn motors to low levels. Proceed to 218 where a determination is made whether the AC power is off. If the AC power is off, proceed again to 218. If the AC power is not off, proceed to 210.

According to another embodiment, the methodology of the present invention provides for alternate recharging sources employed to help recharge the refrigerator backup battery pack 54 and extend the length of time this battery pack 54 can be utilized to cool the refrigeration system. These alternate recharging power sources include but are not limited to solar, wind, hydroelectric, thermoelectric and basic fuel driven power generators.

Figure 16:
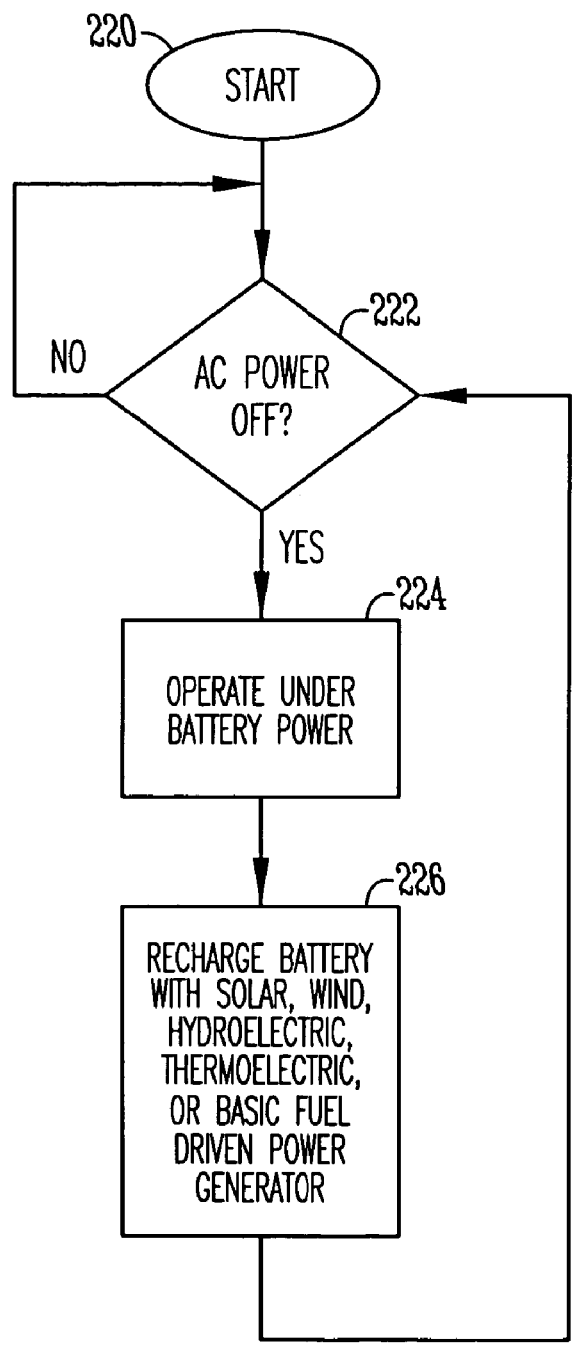
FIG. 16 is a schematic block diagram showing that a battery may be recharged with alternate power sources including solar, wind, hydroelectric, thermoelectric and basic fuel driven power generators.

FIG. 16 shows the method starting at 220 and continuing to 222 where a determination is made whether the AC power is off. If the AC power is not off, proceed again to 222. If the AC power is off, proceed to 224, operate under battery power. Proceed to 226, recharge battery with solar, wind, hydroelectric, thermoelectric or basic fuel driven power generators. Proceed back to 222.

The refrigerator of the present invention may be utilized in all sorts of vehicles, boats, airplanes, or other systems, as well as in usual household appliances. It also may be used in commercial establishments for coolers by using the AC power source during times of reduced load and using the DC power source at least during part-time of the peak load of the AC system, thereby saving considerable expense.

The inverter/charger may be combined into one unit or may be separate units. Furthermore, cooled air from the cooling system may be directed to the inverter/charger for cooling it.

Referring to FIGS. 1 and 5 it is possible to direct cooled air passing through cooling system 55 so that it passes into mechanical compartment 48 through a discharge opening 88. This causes the cooled air to pass downwardly and cool the components within mechanical compartment 48.

The present invention will be described as it applies to its preferred embodiment. It is not intended that the present invention be limited to the described embodiment. It is intended that the invention cover all alternatives, modifications, and equivalencies which may be included within the spirit and scope of the invention.

The preferred embodiment of the present invention has been set forth in the drawings, specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A refrigerator for connection to an AC power source comprising:
    a refrigerator cabinet having a rear wall, a front wall, opposite side walls, a top wall, and a bottom wall;
    the refrigerator cabinet enclosing one or more refrigeration compartments and a mechanical compartment;
    the mechanical compartment containing a battery pack, an inverter/charger, and a refrigeration system;
    one or more cooling systems for cooling the one or more refrigeration compartments;
    the refrigeration system being connected to the one or more cooling systems for causing the cooling systems to cool the one or more refrigeration compartments;
    the inverter/charger having an inverter connected to the refrigeration system for converting DC electrical current to AC electrical current, and having a charger connected to the battery pack for receiving AC electrical current and charging the battery pack;
    a switch movable from a DC position connecting the battery pack to the inverter/charger and the refrigeration system for operating the refrigeration system, to an AC position connecting the AC power source to the charger for charging the battery pack and to the refrigeration system for operating the refrigeration system;
    a controller connected to the switch for causing the switch to move to the DC position during a first predetermined time and for causing the switch to move to the AC position during a second predetermined time;
    wherein the AC power source includes a peak demand time and a reduced demand time, the first and second predetermined times being coordinated so that the first predetermined time falls within the peak demand time and the second predetermined time falls within the reduced demand time.

2. The refrigerator according to claim 1 wherein the refrigerator and the mechanical compartments have a combined depth dimension in the range of 28 to 30 inches.

3. The refrigerator according to claim 1 wherein the refrigeration system is a Rankine vapor-compression cycle and contains a compressor and a heat exchanger fan.

4. The refrigerator according to claim 1 wherein the refrigeration is a Stirling cycle and contains a Stirling motor and a circulation pump.

5. The refrigerator according to claim 1 wherein the refrigeration system is an absorption system and contains a pump and may contain an electric heater.

6. The refrigerator according to claim 1 wherein the refrigeration system is a thermoelectric system and contains a thermoelectric element.

7. The refrigerator according to claim 1 wherein the refrigeration system is a magnetic system and contains an electromagnet and a fan.

8. The refrigerator according to claim 1 wherein the refrigeration system is an acoustic system and contains a speaker and a fan.

9. A refrigerator for connection to an AC power source comprising:
    a refrigerator cabinet having a rear wall, a front wall, opposite side walls, a top wall, and a bottom wall;
    the refrigerator cabinet enclosing one or more refrigeration compartments and a mechanical compartment;
    the mechanical compartment containing a battery pack, an inverter/charger, and a refrigeration system;
    one or more cooling systems for cooling the one or more refrigeration compartments;
    the refrigeration system being connected to the one or more cooling systems for causing the cooling systems to cool the one or more refrigeration compartments;
    the inverter/charger having an inverter connected to the refrigeration system for converting DC electrical current to AC electrical current, and having a charger connected to the battery pack for receiving AC electrical current and charging the battery pack;
    a switch movable from a DC position connecting the battery pack to the inverter/charger and the refrigeration system for operating the refrigeration system, to an AC position connecting the AC power source to the charger for charging the battery pack and to the refrigeration system for operating the refrigeration system;
    a controller connected to the switch for causing the switch to move to the DC position during a first predetermined time and for causing the switch to move to the AC position during a second predetermined time;
    wherein the controller is capable of sensing a failure in the AC power source and automatically causes the switch to switch to the DC position upon sensing a failure in the AC power source.

10. A refrigerator for connection to an AC power source comprising:
    a refrigerator cabinet having a rear wall, a front wall, opposite side walls, a top wall, and a bottom wall;
    the refrigerator cabinet enclosing one or more refrigeration compartments and a mechanical compartment;
    the mechanical compartment containing a battery pack, an inverter/charger, and a refrigeration system;
    one or more cooling systems for cooling the one or more refrigeration compartments;

the refrigeration system being connected to the one or more cooling systems for causing the cooling systems to cool the one or more refrigeration compartments;

the inverter/charger having an inverter connected to the refrigeration system for converting DC electrical current to AC electrical current, and having a charger connected to the battery pack for receiving AC electrical current and charging the battery pack;

a switch movable from a DC position connecting the battery pack to the inverter/charger and the refrigeration system for operating the refrigeration system, to an AC position connecting the AC power source to the charger for charging the battery pack and to the refrigeration system for operating the refrigeration system;

a controller connected to the switch for causing the switch to move to the DC position during a first predetermined time and for causing the switch to move to the AC position during a second predetermined time;

a manual override switch between the controller and the refrigeration system, the manual override switch having a first position connecting the battery pack and the inverter/charger to the refrigeration system and a second position connecting the AC power source to the refrigeration system and to the inverter/charger.

11. A refrigerator for connection to an AC power source comprising:

a refrigerator cabinet having a rear wall, a front wall, opposite side walls, a top wall, and a bottom wall;

the refrigerator cabinet enclosing one or more refrigeration compartments and a mechanical compartment;

the mechanical compartment containing a battery pack, an inverter/charger, and a refrigeration system;

one or more cooling systems for cooling the one or more refrigeration compartments;

the refrigeration system being connected to the one or more cooling systems for causing the cooling systems to cool the one or more refrigeration compartments;

the inverter/charger having an inverter connected to the refrigeration system for converting DC electrical current to AC electrical current, and having a charger connected to the battery pack for receiving AC electrical current and charging the battery pack;

a switch movable from a DC position connecting the battery pack to the inverter/charger and the refrigeration system for operating the refrigeration system, to an AC position connecting the AC power source to the charger for charging the battery pack and to the refrigeration system for operating the refrigeration system;

wherein an air channel directs cooled air from the cooling system into the mechanical compartment for cooling the battery pack, inverter/charger, and refrigeration system.

12. A refrigerator adapted to be connected to an AC power source, the power source having a peak demand time wherein a first amount of power is required from the power source and a reduced demand time wherein a second amount of power, less than the first amount of power, is required from the power source, the refrigerator comprising:

a refrigerator cabinet enclosing one or more refrigeration compartments;

one or more cooling systems for cooling the one or more refrigeration compartments;

a battery pack, an inverter/charger, and a refrigeration system;

the refrigeration system being connected to the one or more cooling systems for causing the cooling systems to cool the one or more refrigeration compartments;

an inverter for converting DC electrical current to AC electrical current, the inverter being electrically connected to both the battery pack and the refrigeration system;

a charger connected to the battery pack for receiving AC electrical current and charging the battery pack;

a switch movable from a DC position connecting the battery pack to the inverter and the refrigeration system for operating the refrigeration system, to an AC position connecting the AC power source to the charger for charging the battery pack and to the refrigeration system for operating the refrigeration system;

a controller connected to the switch for causing the switch to move to the DC position during a first predetermined time and for causing the switch to move to the AC position during a second predetermined time;

the controller causing the first predetermined time to fall within the peak demand time and the second predetermined time to fall within the reduced demand time.

13. The refrigerator according to claim 12 wherein the inverter and the charger are a single unit having an inverter mode for causing the inverter to drive the refrigeration system and having a charging mode for causing the charger to charge the battery pack.

14. The refrigerator according to claim 12 wherein the controller is connected to the power source and is capable of causing the switch to switch to the DC position automatically whenever the AC power source fails.

15. A method of controlling a refrigerator having one or more refrigeration compartments, one or more cooling systems for cooling the one or more refrigeration compartments, a refrigeration system connected to the one or more cooling systems; a battery pack and an AC power source, the method comprising:

switching an electrical circuit to a battery mode wherein the refrigeration system is driven by a battery pack;

switching the electrical circuit from the battery mode to an AC mode wherein the AC refrigeration system is connected to, and driven by, an AC power source, the AC power source having a peak load time wherein a high load is drawn from the AC power source, and a reduced load time wherein a low load is drawn from the AC power source;

charging the battery pack during the time that the AC refrigeration system is in the AC mode;

maintaining the refrigeration system and the battery pack within a mechanical compartment located between a front wall and a rear wall of the refrigerator;

controlling the switching of the electrical circuit between the battery mode and the AC mode so that the battery mode occurs during at least a portion of the peak load time.

16. The method according to claim 15 wherein the step of switching the electrical circuit to a battery mode further comprises generating a DC current from the battery pack, converting the DC current to AC current, and delivering the AC current to the refrigeration system.

17. The method according to claim 16 wherein the step of charging the battery pack further comprises using the AC power source to operate a charger connected to the battery pack.

18. A household refrigerator comprising:

at least one refrigerator compartment;

a cooling system for cooling the refrigerator compartment;

a refrigeration system connected to the cooling system and adapted to be actuated for cooling the cooling system;
an AC power source;
a DC power source;
an AC/DC inverter connected to the refrigeration system and being capable of receiving and converting DC power to AC power;
a charger connected to the DC power source for receiving AC current and charging the DC power source;
a switch movable from an AC position electrically connecting the AC power source to the refrigeration system for activating the refrigeration system and electrically connecting the AC power source to the charger for causing the charger to charge the DC power source;
the switch being movable to a DC position disconnecting the refrigeration system from the AC power source and connecting the DC power source and the AC/DC inverter to the refrigeration system for activating the refrigeration system;
a controller connected to the switch and controlling the movement of the switch between the AC position and the DC position;
wherein the controller being programmed to cause the switch to move to the DC position during peak load conditions on the AC power source.

19. The household refrigerator of claim 18 and further comprising the controller being responsive to a predetermined power change emanating from the AC power source to cause the switch to move to the DC position.

20. The household refrigerator of claim 19 wherein the predetermined power change is a reduction in voltage from the AC power source.

21. The household refrigerator of claim 19 wherein the predetermined power change is a complete loss of voltage from the AC power source.

22. The household refrigerator of claim 18 wherein the peak load condition occurs when the average power load drawn from the AC power source is at a high point that is higher than occurring during a reduced peak load condition.

23. A refrigerator comprising:
a refrigerator cabinet forming at least one refrigerator compartment;
a plurality of electrical components, each capable of actuation to perform a plurality of refrigerator functions within the refrigerator cabinet, at least one of the refrigerator functions comprising cooling the at least one refrigerator compartment;
an AC power source operatively connected to the plurality of electrical components for actuating each of the electrical components;
a battery circuit comprising a rechargeable battery and an AC/DC inverter;
a switch having a first position connecting the battery circuit to the refrigeration system and a second position disconnecting the battery circuit to the plurality of electrical components;
a controller electrically connected to the switch for controlling the movement of the switch between the first and second positions, the controller also being connected to the plurality of electrical components and being convertible from at least a first control level activating all the plurality of electrical components to a second control level activating a first group of the plurality of electrical components and deactivating a second group of the plurality of electrical components so as to reduce the power usage level;
wherein the controller includes a timer for converting from the first level to the second level after a predetermined interval of time.

24. The refrigerator of claim 23 wherein the second group of electrical components is selected from the group consisting essentially of a refrigeration system.

25. The refrigerator according to claim 23 wherein the second level allows for greater variance of temperatures about a target temperature than the first control level.

26. A refrigerator comprising:
a refrigerator cabinet forming at least one refrigerator compartment;
a plurality of electrical components, each capable of actuation to perform a plurality of refrigerator functions within the refrigerator cabinet, at least one of the refrigerator functions comprising cooling the at least one refrigerator compartment;
an AC power source operatively connected to the plurality of electrical components for actuating each of the electrical components;
a battery circuit comprising a rechargeable batten and an AC/DC inverter;
a switch having a first position connecting the battery circuit to the refrigeration system and a second position disconnecting the battery circuit to the plurality of electrical components;
a controller electrically connected to the switch for controlling the movement of the switch between the first and second positions, the controller also being connected to the plurality of electrical components and being convertible from at least a first control level activating all the plurality of electrical components to a second control level activating a first group of the plurality of electrical components and deactivating a second group of the plurality of electrical components so as to reduce the power usage level;
wherein the controller includes a user input for causing the switch to move to the second position in response to the predetermined power condition and the controller is programmed to select the first group of the plurality of electrical components from the group consisting essentially of a light, an ice maker, a defrost heater, a high performance specialty compartment, a dispenser, a condenser fan, a damper motor, an anti-condensation heater, and a stirring fan so that the cumulative power consumption level of the plurality of electrical components is equal to or less than a predetermined power consumption level;
wherein the controller includes a battery level sensor for sensing the level of battery power in the rechargeable battery, and for converting from the first level to the second level in response to sensing a predetermined minimum level of battery power in the rechargeable battery.

27. The refrigerator of claim 26 wherein the controller includes a temperature sensor for sensing the temperature of the at least one refrigerator compartment, the controller selecting different combinations of the plurality of electrical components for the first group to keep the temperature within the at least one refrigerator compartment below a predetermined safe maximum temperature.

28. A refrigerator comprising:
a refrigerator cabinet forming at least one refrigerator compartment;
a plurality of electrical components, each capable of actuation to perform a plurality of refrigerator functions within the refrigerator cabinet, at least one of the refrigerator functions comprising cooling the at least one refrigerator compartment;

an AC power source operatively connected to the plurality of electrical components for actuating each of the electrical components;

a battery circuit comprising a rechargeable battery and an AC/DC inverter;

a switch having a first position connecting the battery circuit to the refrigeration system and a second position disconnecting the battery circuit to the plurality of electrical components;

a controller electrically connected to the switch for controlling the movement of the switch between the first and second positions, the controller also being connected to the plurality of electrical components and being convertible from at least a first control level activating all the plurality of electrical components to a second control level activating a first group of the plurality of electrical components and deactivating a second group of the plurality of electrical components so as to reduce the power usage level;

at least a first and a second refrigerator compartment, a first electrical component and a second electrical component of the plurality of electrical components providing cooling of the first and second refrigerator compartments, respectively, the controller deactivating the first electrical component when in the second control level.

* * * * *